(12) United States Patent
Dale et al.

(10) Patent No.: US 9,539,921 B2
(45) Date of Patent: Jan. 10, 2017

(54) HEAD SUPPORT FOR A PUSHCHAIR

(75) Inventors: Caroline Dale, London (GB); Sebastian Orby Conran, London (GB); David Jonathan Moseley, Gloucestershire (GB); Linden James Davies, London (GB); Christopher Barlow, London (GB)

(73) Assignee: Caroline Dale, London (GB)

( * ) Notice: Subject to any disclaimer, the term of this patent is extended or adjusted under 35 U.S.C. 154(b) by 185 days.

(21) Appl. No.: 13/977,475

(22) PCT Filed: Dec. 22, 2011

(86) PCT No.: PCT/GB2011/001763
§ 371 (c)(1),
(2), (4) Date: Jun. 25, 2014

(87) PCT Pub. No.: WO2012/089997
PCT Pub. Date: Jul. 5, 2012

(65) Prior Publication Data
US 2014/0300169 A1    Oct. 9, 2014

(30) Foreign Application Priority Data
Dec. 31, 2010 (GB) .................. 1022148.9

(51) Int. Cl.
*A47C 1/10* (2006.01)
*B60N 2/28* (2006.01)
(Continued)

(52) U.S. Cl.
CPC ........... *B60N 2/2851* (2013.01); *B60N 2/4805* (2013.01); *B60N 2/4879* (2013.01); *B62B 9/106* (2013.01); *B62B 9/12* (2013.01)

(58) Field of Classification Search
CPC ........ A47C 7/383; A47C 7/38; B60N 2/4879; B60N 2/4882; B60N 2/2851; B60N 2/487
(Continued)

(56) References Cited

U.S. PATENT DOCUMENTS 2,835,311 A * 5/1958 Reeves ............... B60N 2/4879
                                                              297/230.11
3,017,221 A * 1/1962 Emery .................. A47C 7/383
                                                              297/397
(Continued)

FOREIGN PATENT DOCUMENTS

CN    1253894 A    5/2000
EP    1002710 A2   5/1999
(Continued)

*Primary Examiner* — Laurie K Cranmer
(74) *Attorney, Agent, or Firm* — Hall Estill Attorneys at Law (57) ABSTRACT

A head support for a pushchair comprises a support section, a seat connection section and a back support. The support section forms a U-shape and comprises an armature, comprising sides, that provides stiffness to the support section. The seat connection section is coupled to the support section and is for connecting to the pushchair. The back support is connected to the support section or connectable to the support section and configured such that, when connected to the support section, it prevents the sides of the armature from dropping relative to the back support in use.

20 Claims, 4 Drawing Sheets

(51) Int. Cl.
  *B60N 2/48*  (2006.01)
  *B62B 9/10*  (2006.01)
  *B62B 9/12*  (2006.01)

(58) Field of Classification Search
  USPC .................................. 297/397, 403, 406, 408
  See application file for complete search history.

(56) References Cited

U.S. PATENT DOCUMENTS

| | | | | |
|---|---|---|---|---|
| 3,156,500 | A * | 11/1964 | Kerr | A61G 15/125 297/230.13 |
| 4,440,443 | A * | 4/1984 | Nordskog | A47C 7/38 297/217.4 |
| 5,248,182 | A * | 9/1993 | Hittie | A47C 7/425 297/230.1 |
| 5,383,711 | A * | 1/1995 | Houghteling | A47D 15/006 297/397 |
| 5,544,378 | A * | 8/1996 | Chow | A47C 7/383 297/397 |
| 5,735,576 | A * | 4/1998 | Pepys | A47D 15/006 297/219.12 |
| 5,918,933 | A * | 7/1999 | Hutchinson | A47C 7/72 128/869 |
| 6,135,553 | A * | 10/2000 | Lovie | B60N 2/2821 297/250.1 |
| 6,305,749 | B1 * | 10/2001 | O'Connor | A47C 7/383 297/397 |
| 6,460,207 | B1 * | 10/2002 | Papay | A47G 9/1009 5/603 |
| 6,811,216 | B2 * | 11/2004 | Sedlack | A47D 13/02 297/250.1 |
| 6,935,685 | B2 * | 8/2005 | Kassai | B62B 9/24 297/219.1 |
| 6,951,367 | B1 * | 10/2005 | Dinnan | B60N 2/449 297/228.1 |
| 7,093,903 | B2 * | 8/2006 | O'Connor | A47C 7/383 297/397 |
| 7,234,771 | B2 * | 6/2007 | Nakhla | B60N 2/2845 297/219.12 |
| 7,644,990 | B2 * | 1/2010 | Pearson | A47C 7/383 297/219.12 |
| 7,744,158 | B2 * | 6/2010 | Schurg | B60N 2/4882 297/391 |
| 7,926,881 | B1 * | 4/2011 | Youreman | A47D 15/006 297/230.12 |
| 8,251,457 | B2 * | 8/2012 | Britton | B60N 2/2806 297/219.1 |
| 8,316,488 | B2 * | 11/2012 | Rojas | A47C 7/383 297/393 |
| 8,459,737 | B2 * | 6/2013 | Brotsch | A47C 7/425 297/230.1 |
| 8,690,237 | B2 * | 4/2014 | Allen | B60N 2/2851 297/216.11 |
| 8,991,929 | B2 * | 3/2015 | Doucette | B62B 5/082 297/423.26 |
| 2001/0054837 | A1 | 12/2001 | O'Connor | |
| 2004/0207241 | A1 * | 10/2004 | Sedlack | A47D 13/02 297/250.1 |
| 2005/0268381 | A1 * | 12/2005 | Balensiefer | A42B 3/00 2/410 |
| 2007/0108827 | A1 * | 5/2007 | Clough | A47C 7/38 297/391 |
| 2008/0018158 | A1 * | 1/2008 | Pos | B60N 2/2851 297/397 |
| 2009/0001801 | A1 * | 1/2009 | Gold | A47D 5/00 297/452.47 |
| 2010/0066138 | A1 * | 3/2010 | Rumack | B60N 2/2851 297/219.12 |
| 2010/0148543 | A1 * | 6/2010 | Runk | B60N 2/2872 297/216.12 |
| 2011/0163520 | A1 * | 7/2011 | Fair | A63H 33/006 280/658 |

FOREIGN PATENT DOCUMENTS

| | | |
|---|---|---|
| FR | 2690398 A1 | 10/1993 |
| FR | 2716844 A1 | 9/1995 |
| JP | 2001-080397 A | 3/2001 |
| TW | M246218 | 10/2004 |
| TW | I248887 | 2/2006 |
| TW | 200718598 | 5/2007 |

* cited by examiner

HEAD SUPPORT FOR A PUSHCHAIR

The present invention relates to a head support for a pushchair, a kit of parts comprising a pushchair and a head support, and a pushchair comprising a head support.

Infant seats such as pushchairs (also sometimes referred to as strollers) and infant car seats are used to transport infants. Unfortunately, it is common to see an infant in an unhealthy postural position in such a seat. For example, infants may be slumped and lethargic, or even collapsed into an awkward postural position particularly as they sleep.

In recent years, the designs of infant seats seem to have been driven by the needs of the operator, rather than the wellbeing of the occupant. The health of the infant is often not considered in the literature relating to such infant seats. Infant seats infrequently provide correct support for the head/neck area of the spine of the infant.

However, the postural position of the infant in an infant seat is important because an inappropriate postural position particularly for an infant in their formative early years might lead to physical problems later on. Such physical problems may be, for example, musculoskeletal or other functional problems, such as problems with circulation, digestion or respiration.

Posture is particularly important for infants because the spine of an infant increases by about 50% in length during its first year of life and approximately double in length by the age of five. The spine grows most rapidly between birth and the age of one or two. The spine continues to grow until the age of about 18 years. Hence, spinal distortions that occur in infants particularly between the ages of one and three years need to be addressed.

The present invention seeks to alleviate, at least partially, some or any of the above problems.

FR 2 690 398 discloses a device to position the diagonal seat belt on the back seat of a car. The device comprises a support which has, on its front, attachment means adapted to cooperate with complementary means of a removable bracket for positioning the diagonal of the belt.

According to the present invention, there is provided a head support for a pushchair, the head support comprising: a support section that forms a U-shape and comprising an armature, comprising sides, that provides stiffness to the support section; a seat connection section coupled to the support section and for connecting to the pushchair; and a back support that is connected to the support section or connectable to the support section and configured such that, when connected to the support section, it prevents the sides of the armature from dropping relative to the back support in use.

The head support provides postural support to the head of the infant. The support section provides consistent support to the head of the infant because it is rigidly connected to the pushchair via the seat connection section.

In an embodiment of the present invention, the support section is coupled to the seat connection section such that its position relative to the seat connection section may be adjusted.

This may be advantageous because the position of the support section can be adjusted for infants of different sizes such that the support section supports the infant at its head regardless of its size.

According to the present invention, the support section is configured to form a U-shape when viewed from above comprising a back and two sides for extending around the back and sides of a head of an infant.

This may be advantageous because the support section provides lateral support to the sides of the head of the infant. This prevents the head of the infant from slumping to either side, thereby reducing spinal distortion.

According to the present invention, the support section may be connected to the back support by a hinge such that the support section can flip back relative to the back support.

This may be advantageous because the support section can be flipped out of the way when it is not needed. This may also have the advantage that the support section can be flipped out of the way when folding the pushchair.

Embodiments of the invention will be described, by way of example only, with reference to the accompanying drawings in which.

Figure 1:
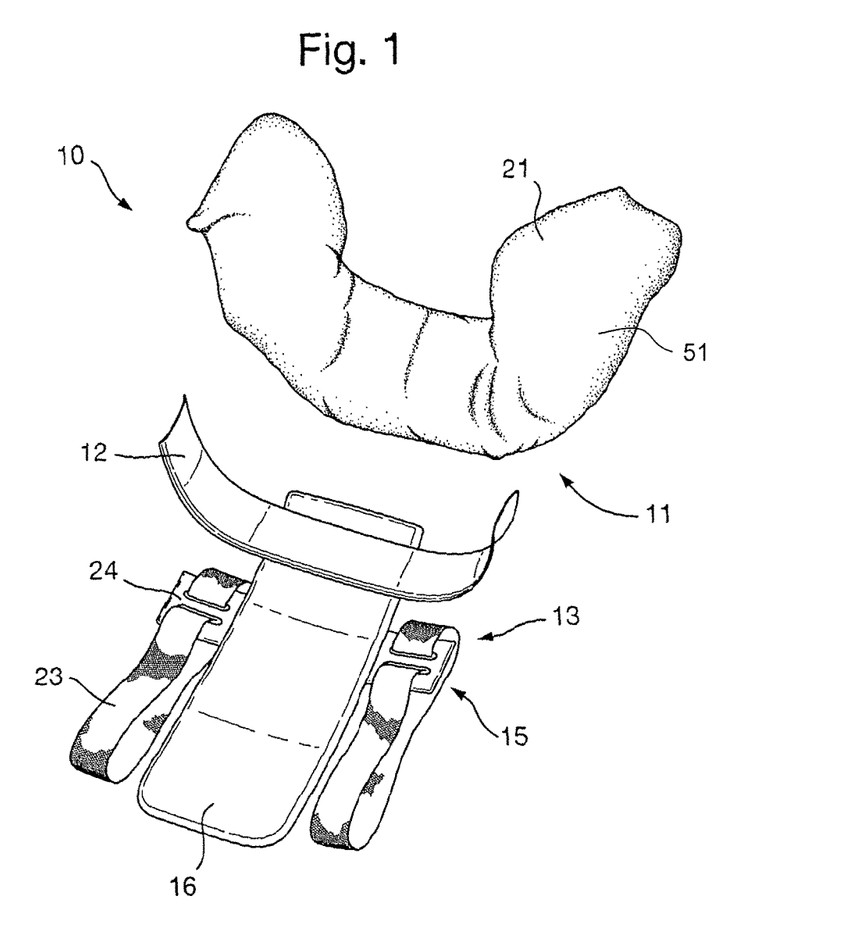
FIG. 1 depicts a head support of an embodiment of the present invention.

FIG. 1 depicts a schematic perspective view of an embodiment of the head support 10 for an infant seat. The head support 10 comprises a support section 11 and a seat connection section 13. The support section 11 comprises an armature 12. The armature 12 is configured to provide stiffness to the support section 11. The seat connection section 13 is coupled to the support section 11. The seat connection section 13 rigidly connects to the infant seat.

The support section 11 provides postural support to an infant in the infant seat. Preferably, the support section 11 provides postural support for the infant's head. This is because supporting the infant's head effectively addresses the problem of an unhealthy postural position of the infant. In the absence of an appropriate postural support, the head can slump at an angle that distorts the spine. Slumping of the head may cause significant distortion of the spine because the infant's head may have a mass in the range of from about 2.5 kg to about 3.5 kg, which is a significantly greater proportion of the mass of the body than in adults. Distortion of the spine can lead to distortion of the rest of the body.

The support section 11 may optionally provide postural support for other parts of the infant's body, such as the infant's neck, for example.

The armature 12 provides stiffness to the support section 11 in addition to any provided by padding of the support section 11. The armature 12 provides a structural support to the support section 11. The armature 12 keeps the support section 11 in the correct position relative to the infant. This helps to ensure that the infant is supported at the targeted areas of the infant's body. This helps to provide a consistent postural support to the child.

By coupling the support section 11 to the seat connection section 13, the support section 11 is held in position by the seat connection section 13, which is rigidly connected to the infant seat. This means that the support section 11 does not rest on the infant (e.g. on the infant's shoulders). A problem with having a head support that rests on the shoulders of the infant is that when the body of the infant moves, the support moves with it. Therefore, by having the support section 11 coupled to the seat connection section 13, the support section 11 is fixed relative to the infant seat regardless of any movement of the infant. As a result, the support section 11 of the present invention provides a consistent level of postural support to the infant even when the infant's body would otherwise move (e.g. when the infant falls asleep). The head support 10 makes the infant seat more comfortable for the infant allowing better ventilation and easier breathing. This is because the head support 10 straightens the neck of the infant and allows an improved upper torso position. This reduces the impairment of respiratory functioning by a collapsed thoracic cavity or upper body.

By rigidly connecting the seat connection section 13 to the infant seat, the seat connection section 13 may maintain its position relative to the infant seat during use. In use, the infant seat is likely to undergo lateral and vertical movements. The rigid connection prevents these lateral and vertical movements from dislodging the head support 10 from the infant seat. The rigid connection further prevents the head support 10 from moving significantly with respect to the infant seat even when the infant moves. For example, the rigid connection prevents the head support 10 from moving vertically upwards with respect to the infant seat even when the shoulders of the child below the support section 11 of the head support 10 move vertically upwards.

The rigid connection may involve a part of the seat connection section 13 looping around a part of the infant seat such that the head support 10 cannot be separated from the infant seat by a sliding movement. Instead, the head support 10 must be unclipped or unstrapped before being removed from the infant seat. For example, the rigid connection may be formed by a strap with hook-and-loop fasteners attached around the harness of the infant seat. Additionally or alternatively, the rigid connection may be formed by a D-ring or the like attached to part of the frame of the infant seat.

In an embodiment, the support section 11 is coupled to the seat connection section 13 such that its position relative to the seat connection section 13 may be adjusted. Preferably, the position of the support section 11 relative to the seat connection section 13 may be adjusted in the vertical direction in use. Here, the vertical direction means the direction of the spine of an infant in the infant seat.

The vertical adjustment may allow the support section 11 of the head support 10 to provide support to the infant in a specific area of the body for infants that have torsos of different sizes. For example, the support section 11 preferably supports the head at the natural level of tilt of the head, namely at the centre of rotation of the head. In particular, the support section 11 may support the head at the level of the first cervical vertebrae of the spine. This is approximately at the jaw-hinge level. The vertical adjustment allows the head support 10 to support any infant at this level regardless of the size of the torso. Hence, the head support 10 of the present invention has versatile use among infants of different sizes and ages.

Figure 2:
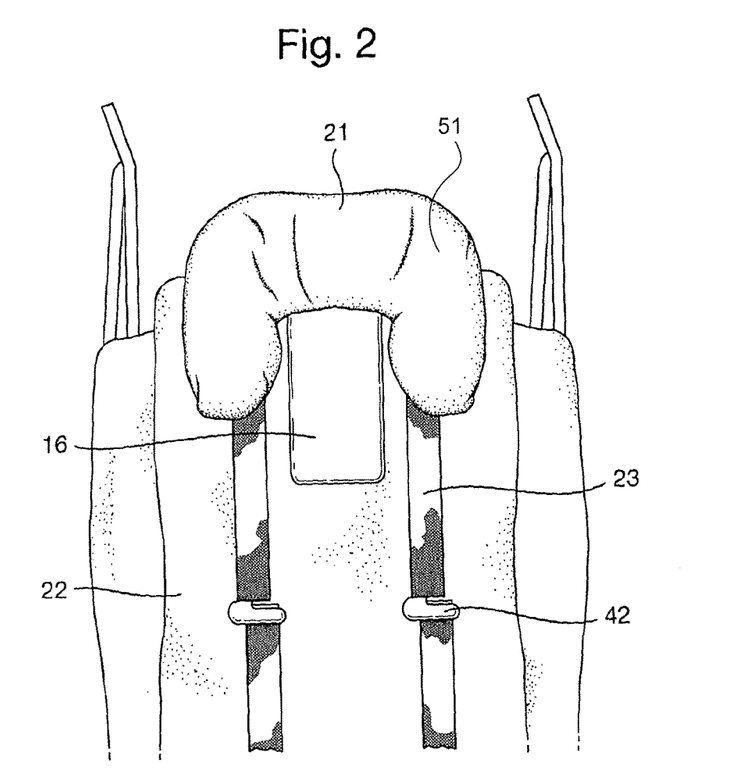
FIG. 2 depicts a head support of an embodiment of the invention with the support section in a raised position relative to the infant seat.

FIG. 2 depicts schematically the head support 10 in use, with the support section 11 in a raised position with respect to the infant seat 22. The support section 11 may be positioned in a raised position with respect to the infant seat 22 for an infant of one year of age, for example.

Figure 3:
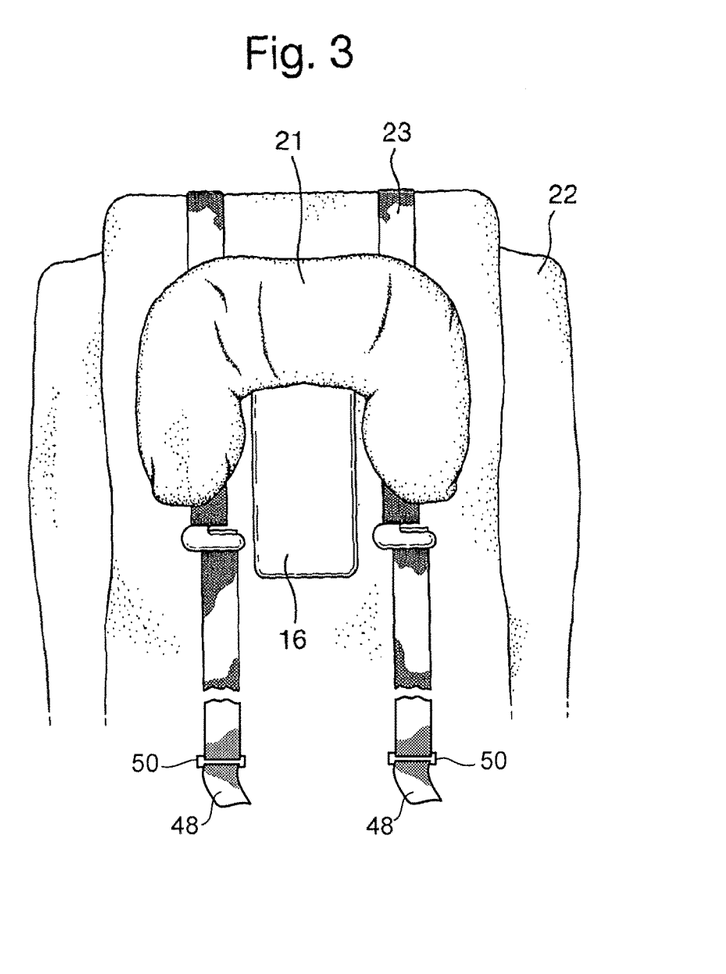
FIG. 3 depicts a head support of an embodiment of the invention with the support section in a lowered position relative to the infant seat.

FIG. 3 depicts the head support 10 depicted in FIG. 2 in a lowered position with respect to the infant seat 22. The lowered position may be used for an infant that is smaller than an infant that would have the support section 11 in the raised position depicted in FIG. 2. For reference, it will be understood that the views in both FIGS. 2 and 3 are at a slightly raised elevation and angle with respect to the infant seat 22. Thus, while the opposing ends of the u-shaped cushion 21 as represented in FIGS. 2 and 3 appear to be pointing downwardly, it will be understood, based on the rigid construction and orientation of the underlying armature 12, that these opposing ends of the cushion 21 project in a direction that is nominally orthogonal to the stiff back support 16 (see FIG. 1).

Regardless of the position of the support section 11 with respect to the seat connection section 13 of the head support 10, the support section 11 may be held in position by the seat connection section 13, which is rigidly connected to the infant seat 22. The support section 11 can move relative to the seat connection section 13 and be fixed at the full range of positions between the positions depicted in FIGS. 2 and 3.

The support section 11 may be fixed relative to the seat connection section 13 by frictional forces. Additionally or alternatively, the support section 11 may be fixed relative to the seat connection section 13 by one or more of press studs, a saw-tooth ridge rack and hook-and-loop fasteners. An operator can move the position of the support section 11 relative to the seat connection section 13 manually. However, in use, the support section 11 is configured to maintain its position with respect to the seat connection section 13 by friction. The friction between the support section 11 and the seat connection section 13 is sufficient such that the support section 11 maintains its position relative to the seat connection section 13 in use as the infant seat undergoes vertical and lateral movements.

In an embodiment, the armature 12 is configured to be sufficiently stiff to retain its shape under the weight of a head of an infant in use. The armature 12 is sufficiently rigid such that it does not move sideways during use. This allows the head support 10 to provide consistent postural support to the infant as the infant is transported in the infant seat 22. If the support section 11 were to move under the weight of the infant's head, then the support section 11 would not provide sufficient support to the infant.

In an embodiment, the support section 11 is configured to form a U-shape comprising a back and two sides for extending around the back and sides of the infant's head. The U-shape of the support section 11 is depicted in FIG. 1. The armature 12 thereby provides postural support to the sides of the infant's head.

The support section 11 provides lateral support to the infant's head without relying on the shape of the infant seat 22. An infant seat may have wings that extend on either side of the infant's head. These wings do not come into contact with the infant's head during normal use of the infant seat. A postural support may be positioned between the sides of the infant's head and the inner surfaces of the wings. However, if the infant seat does not have these wings, then these supports do not provide lateral support to the infant's head. Furthermore, such supports may rest on the shoulders of the infant, thus suffering from the disadvantages identified above.

The present invention addresses this issue by having a U-shaped support section 11 that is coupled to a seat connection section 13 that in turn is rigidly connected to the infant seat 22.

The armature 12 may be formed from a material such as a metal. For example, aluminium, mild steel or stainless steel may be used as a suitable material for making the armature 12. However, other metals, or non-metals such as polymers may be used as the armature 12 to provide a framework to the support section 11 of the head support 10.

In an embodiment, the support section 11 is configured to extend in use around the sides of the head to at least the jawbone of the head. In particular, the support section 11 is configured to extend in use around the sides of the head to at least the posterior edge of the lower jaw. As mentioned above, it is particularly beneficial if postural support is provided to the infant's head at the jaw-hinge level. By extending the support section 11 to at least the jawbone, it is ensured that postural support is provided to this area of the infant's head.

In an embodiment, the armature 12 is plastically deformable such that the sides of the armature 12 can be bent so as to adjust the distance between the sides of the armature 12. For example a ductile metal and/or a malleable polymer may be used. Additionally or alternatively, the armature 12 may comprise a telescopic or hinged mechanical adjustment to allow the armature 12 to be adjusted. The adjustability of the distance between the sides of the armature 12 allows the support section 11 of the head support 10 to be adjusted for different head sizes. The distance between the sides of the armature 12 may be adjusted by at least approximately 100 mm.

Another way to provide the adjustability of the support section 11 for different head sizes is to provide an armature 12 that is hinged. The armature 12 may comprise a back and two sides. The back and sides of the armature 12 may be formed of separate pieces connected by hinges. Once adjusted to a desired shape, the position of the sides of the armature 12 relative to the back of the armature 12 may be maintained by friction. Additionally or alternatively, the position of the sides of the armature 12 relative to the back of the armature 12 may be maintained by one or more of molecular friction, material ductility and natural malleability of the material from which the armature 12 is formed.

Once adjusted, the armature 12 may be sufficiently rigid to retain its shape under the weight of the infant's head in use. The armature 12 maintains the shape that it has been set to. The shape of the armature 12 (e.g. the positions of the sides of the armature 12 relative to the back of the armature 12) can be adjusted. After the adjustment, the armature maintains its shape because it is sufficiently rigid.

An armature that is plastically deformable may be preferable to an armature 12 that is hinged because a hinged armature may be more expensive to manufacture and/or may be more prone to failure and difficult to use.

In an embodiment, the support section 11 is coupled to a seat connection section 13 by a sliding mechanism 15. The sliding mechanism 15 allows the position of the support section 11 to move relative to the seat connection section 13 by a sliding movement.

Figure 4:
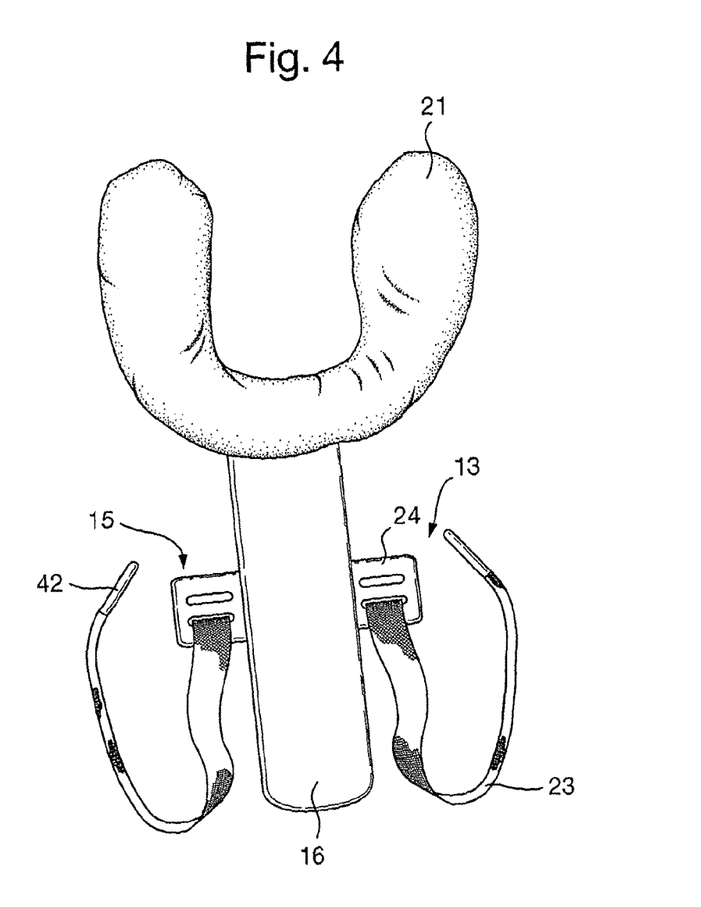
FIG. 4 depicts a head support of an embodiment of the invention with the support section in a flipped back position.

FIG. 4 depicts a head support 10 with a sliding mechanism 15. The sliding mechanism 15 may comprise a buckle 24 having at least two holes and a band 23 that extends through the two holes of the buckle 24. The band 23 may be rigidly connected to the infant seat 22. The buckle 24 is rigidly connected to the support section 11. The buckle 24 may slide relative to the band 23 so as to move the support section 11 relative to the seat connection section 13. The band 23 may form part of the seat connection section 13.

The seat connection section 13 may comprise two or more bands 23 for rigidly connecting to the infant seat 22. For example, FIG. 1 depicts a head support 10 in which two bands 23 and two buckles 24 are provided. The bands 23 may connect to the infant seat 22 at the top of the back of the infant seat 22. The bands 23 may be connected to the top of the back of the infant seat 22 by one or more clips (not shown). The clips may comprise a ductile material forming two arms that are spaced apart by a distance less than the thickness of the back of the infant seat 22 when the clips are not connected to the infant seat 22. When the clips are connected to the infant seat 22, the arms are positioned on opposite sides of the back of the infant seat 22. The elastic force between the arms holds the bands 23 to the infant seat 22.

Additionally or alternatively, the sliding mechanism may comprise at least one rail that is part of the seat connection section 13 and rigidly connects to the infant seat 22 and a clip for each rail that clips into the rail and slides relative to the rail. The clip is rigidly connected to the support section 11. This allows the support section 11 to slide relative to the seat connection section 13.

In an embodiment, the head support 10 further comprises a stiff back support 16 connected to the support section 11 or connectable to the support section 11. The stiff back support 16 is configured such that, when connected to the support section 11, it prevents the sides of the armature 12 from dropping relative to the stiff back support 16 in use. In an embodiment the stiff back support 16 is configured such that, when connected to the support section 11, it prevents the support section 11 from rotating forwards in use.

In an embodiment, the stiff back support 16 is integrally connected to the support section 11. The stiff back support 16 may be permanently connected to the support section 11. The stiff back support 16 may be manufactured as a single component together with the support section 11. For example, the stiff back support 16 may be formed as a single moulding with the support section 11 or may be adhered, or otherwise attached, to the support section 11 during manufacture.

In an embodiment, the stiff back support 16 is connectable to the support section 11. This has an advantage that when the head support 10 is packaged, the stiff back support 16 may be disconnected from the support section 11. The stiff back support 16 may be manufactured as a separate component from the support section 11. In this case, the stiff back support 16 and the support section 11 are configured to be connectable to each other such that a user can connect the stiff back support 16 to the support section 11 before use.

In an embodiment, the stiff back support 16 and the support section 11 are configured to be connectable by, for example, a snap-fit arrangement. In this case, the stiff back support 16 may be substantially irreversibly connected to the support section 11 before use. This means that once connected, the stiff back support 16 and the support section 11 may not be disconnected from each other without a substantial risk of breaking a part of the head support 10. This has an advantage of reducing the possibility of the stiff back support 16 and the support section 11 disconnecting from each other undesirably during use of the head support 10.

In an embodiment, the stiff back support 16 and the support section 11 are configured to be reversibly connectable. This means that once connected, the stiff back support 16 and the support section 11 may be disconnected from each other by the user without breaking any part of the head support 10. This has an advantage that the stiff back support 16 and the support section 11 may be disconnected from each other such that the head support 10 can be stored in a space-saving manner.

In an embodiment, each of the stiff back support 16 and the support section 11 comprises a part of a connection arrangement for the stiff back support 16 to connect to the support section 11. In an embodiment, the connection arrangement comprises a receiving slot on one of the two components and a device on the other. The device may be pushed into the receiving slot and then rotated so as to lock securely in place. In an embodiment, the connection arrangement comprises a chamfered-edge batten on one of the components that slots into a receiving batten on the other component. In an embodiment, the connection arrangement comprises a nut and bolt pairing. In an embodiment, the connection arrangement comprises one or more hook and loop fasteners.

The stiff back support 16 may be formed of a polymer, for example a polypropylene sheet. Other materials may also be used. The stiff back support 16 provides stability to the support section 11 such that the support section 11 maintains its position relative to the infant seat 22 during use.

This addresses the issue that the support section 11 can otherwise droop forwards under its own weight in use, namely the sides of the armature 12 can drop relative to the back of the infant seat 22 in use. The armature 12 is preferably formed of a band, namely an elongated piece of material that is thin, wide and long in its three dimensions. By forming the armature 12 of a band, the back of the armature 12 can press substantially flat against the stiff back support 16. This maintains the erect attitude of the sides of armature 12 with respect to the infant seat 22 during use.

Alternatively or additionally, the armature 12 may include a wire curved into a U-shape. However, the band shape may be advantageous because the band shape allows the pressing of the band against the stiff back support 16 to provide stability to the position of the support section 11.

FIG. 4 depicts the head support in an arrangement in which the support section 11 has been flipped upwards relative to the rest of the head support 10.

Figure 5:
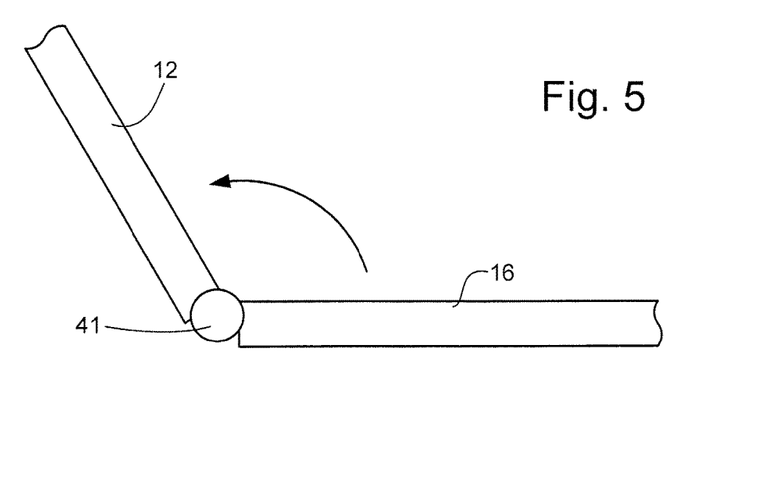
FIG. 5 schematically depicts the hinge of the head support.

In an embodiment, the armature 12 of the support section 11 from FIG. 1 is hinged relative to the stiff back support 16. A hinge 41 is configured to allow the armature 12 to be folded upwards relative to the rest of the head support 10, as generally shown in FIG. 5. When the support section 11 is in the raised position relative to the seat connection section 13, the support section 11 may overlap the top edge of the infant seat 22. In this case, the hinge 41 allows the support section 11 to be folded rearwards over the top edge of the infant seat 22. Hence, it is the configuration of the hinge 41 that allows the support section 11 to flip back relative to the infant seat 22 in use.

The hinge 41 may comprise a foldable piece of material, e.g. plastic. The hinge 41 may comprise two pieces of material connected by a bolt, a spindle or a pin, for example. The hinge 41 is jointed so as to allow the support section 11 to pivot relative to the stiff back support 16.

This may be beneficial in that, when the head support 10 is not needed, the support section 11 can be lifted and folded out of the way of the infant. For example, an older infant may require the postural support provided by the head support 10 only when asleep. In this case, when the infant is awake, the support section 11 can be flipped out of the way of the infant.

A further benefit of the support section 11 being hinged relative to the stiff back support 16 is that this may make it easier to fold the infant seat 22 if the infant seat is foldable. For example, many pushchairs are foldable. In this case, the support section 11 can be flipped up and out of the way of the main body of the foldable pushchair. This may allow the pushchair to be folded away neatly without the wheels coming into contact with the surface of the support section 11 that comes into contact with the infant's head. This keeps the infant contact surface of the support section 11 clear from dirt from the wheels. The rear side of the support section 11 may come into contact with the dirty wheels of the foldable pushchair. In an embodiment, the rear side of the support section 11 has a surface that can be easily wiped clean.

In an embodiment, the support section 11 comprises a cushion 21. FIG. 1 depicts the cushion 21 separated from the rest of the head support 10. Preferably the cushion 21 is on an opposite side of the armature 12 from the infant seat 22 in use. The cushion 21 comes into contact with the infant's head. The cushion 21 provides a soft backing for the infant's head. Meanwhile, the armature 12 provides rigid support for the infant's head.

In an embodiment, the cushion 21 comprises a cushion cover and padding. In an embodiment, the cushion cover (denoted at 51 in FIGS. 1-4) is easily removable from the armature 12. This allows the cushion cover to be washed or exchanged. For example, a woolly cushion cover may be used in winter and cushion covers of different colours or patterns can be used. The cushion cover is configured to surround the padding. The cushion cover may be made of knitted cotton, or other washable fabrics. In an embodiment, separate sections of padding are provided for the back and sides of the support section 11 of the head support 10. In this case, the separate sections of padding are all covered by the cushion cover.

In an embodiment, the armature 12 is attached to the main body of the head support 10. In other words, the armature 12 is connected to the seat connection section 13 of the head support 10 in a way that does not allow it to be easily removed in the same way that the cushion cover can be removed from the armature 12.

In an embodiment, the head support 10 is attachable to and detachable from the infant seat 22. This allows the head support 10 be an optional accessory to an infant seat 22.

In an embodiment, the seat connection section 13 of the head support 10 comprises at least one connector. In an embodiment, the seat connection section 13 comprises at least two connectors for connecting rigidly to the infant seat 22. Two connectors may be positioned laterally with respect to each other so as to connect rigidly the head support 10 to the infant seat 22. This helps to prevent sideways movement of the head support 10 relative to the infant seat 22.

In an embodiment, the seat connection section 13 comprises at least one connector for connecting rigidly to the front of the infant seat 22 and at least one connector for connecting rigidly to the back of the infant seat 22. The connector at the front of the infant seat 22 may connect rigidly to a harness of the infant seat 22, such as the harness 48 depicted in FIG. 3. Additionally or alternatively, the connector at the front of the infant seat 22 may connect rigidly to a strap opening 50 of the infant seat 22, as also generally shown in FIG. 3. Such strap openings 50 are provided on some infant seats to allow a harness or other strap such as 48 to pass through. The connector at the back of the infant seat 22 may connect rigidly to a frame of the infant seat 22, or may comprise a loop extending over the back of the infant seat 22.

In an embodiment, the seat connection section 13 comprises at least one band 23, or optionally at least two bands 23, for example one on either side of the head support 10. The connectors mentioned above may be attached to one or both ends of the bands 23. The bands 23 may extend from the front of the infant seat 22 to the back of the infant seat 22. The bands 23 may extend over the top edge of the back support of the infant seat 22.

The connector may be a D-ring, or a strap 42 having fasteners for attaching to the infant seat. The fasteners may be hook-and-loop fasteners, as denoted at 52 in FIG. 4.

As mentioned above, the head support 10 of the present invention can be fitted to a range of infant seats.

An embodiment of the invention is a kit of parts comprising an infant seat 22 and the head support 10 as described above. The design of the infant seat 22 is not limited. The head support 10 of the present invention can be attached to any infant seat 22 even if the infant seat 22 has not been specifically designed to be used in combination with the head support 10.

In an embodiment, the infant seat 22 may be specially designed for attachment to the head support 10. For example, the seat connection section 13 described above may be configured to connect to a complementary connection section that is integral to the infant seat 22.

The head support 10 does not have to be attachable to and detachable from the infant seat 22. In an embodiment, the head support 10 is integral to the infant seat 22. In this case the seat connection section 13 is permanently attached to the infant seat 22.

The head support 10 of the present invention can be fitted to a pushchair and/or an infant car seat.

The invention claimed is:

1. A head support for a collapsible pushchair of the type having a flexible seat portion configured to support an infant of up to about three years of age, the head support comprising:
   a support section that forms a U-shape and comprising an armature, formed of a band of material having a base portion and opposing sides, that provides stiffness to the support section;
   a seat connection section coupled to the support section and configured for connection to the pushchair, wherein the support section is coupled to the seat connection section and the seat connection section has a sliding mechanism that allows the position of the support section to move relative to the seat connection section by a sliding movement to facilitate adjustment of the head support in a vertical direction relative to the seat portion of the pushchair; and
   a stiff back support that is connected to the support section or connectable to the support section and configured such that, when connected to the support section, the back support prevents the sides of the armature from dropping relative to the back support in use, a back surface of the base portion of the armature contactingly engaging the back support during use of the head support.

2. The head support of claim 1, wherein the support section is connected to the back support by a hinge, such that the support section may be flipped back relative to the back support.

3. The head support of claim 1, wherein the armature has sufficient stiffness to retain its shape under the weight of a mass of 3.5 kg in use.

4. The head support of claim 1, wherein the armature is plastically deformable such that the sides can be bent so as to adjust the distance between the sides of the armature.

5. The head support of claim 1, wherein the opposing sides of the armature are moveable with respect to the base portion such that an intervening distance between the opposing sides of the armature may be adjusted.

6. The head support of claim 1, wherein the support section comprises a removable cushion cover.

7. The head support of claim 1, wherein the head support is attachable to and detachable from the pushchair.

8. The head support of claim 1, wherein the seat connection section comprises at least one of a D-ring and a strap having hook-and-loop fasteners for attaching the head support to the pushchair.

9. A kit of parts comprising:
   a pushchair; and
   the head support of claim 1.

10. A pushchair comprising the head support of claim 1, wherein the head support is integral to the pushchair.

11. The head support of claim 1, wherein the seat connection section comprises at least one connector at the front of the pushchair for connecting to an opening extending through the pushchair adapted to accommodate passage of a harness of the pushchair therethrough.

12. A head support for a collapsible pushchair of the type having a flexible seat portion configured to support an infant of up to about three years of age, the head support comprising:
   a support section that forms a U-shape and comprising an armature, formed of a band of material having base portion and opposing sides, that provides stiffness to the support section;
   a seat connection section coupled to the support section and configured for connection to the pushchair, wherein the seat connection section comprises at least one connector at the front of the pushchair for connecting to a harness of the pushchair to facilitate adjustment of the head support in a vertical direction relative to the seat portion of the pushchair, the seat connection section further comprising at least one band for connecting to the pushchair, wherein each connector is attached to an end of a corresponding band; and
   a stiff back support that is connected to the support section or connectable to the support section and configured such that, when connected to the support section, the back support prevents the sides of the armature from dropping relative to the back support in use, a back surface of the base portion of the armature contactingly engaging the back support during use of the head support.

13. The head support of claim 12, wherein each band is connectable to the pushchair at the top of the back of the pushchair.

14. The head support of claim 12, further comprising a hinge that attaches the armature to the back support to facilitate upwardly directed rotational movement of the armature away from the back support.

15. The head support of claim 12, wherein the armature has sufficient stiffness to retain its shape under the weight of a mass of 3.5 kg in use.

16. The head support of claim 12, wherein the armature is plastically deformable such that the sides can be bent so as to adjust the distance between the sides of the armature.

17. The head support of claim 12, wherein the opposing sides of the armature are moveable with respect to the base portion such that an intervening distance between the opposing sides of the armature may be adjusted.

18. The head support of claim 12, wherein the support section comprises a removable cushion cover.

19. The head support of claim 18, wherein the removable cushion cover is adapted to contactingly engage opposing sides of a head of the infant.

20. A head support for a collapsible pushchair of the type having a flexible seat portion configured to support an infant of up to about three years of age, the head support comprising:
   a support section that forms a U-shape and comprising an armature, formed of a band of material having base portion and opposing sides, that provides stiffness to the support section;

a seat connection section coupled to the support section and configured for connection to the pushchair, wherein the seat connection section comprises at least one connector at the front of the pushchair for connecting to a harness of the pushchair to facilitate adjustment of the head support in a vertical direction relative to the seat portion of the pushchair;

a stiff back support that is connected to the support section or connectable to the support section and configured such that, when connected to the support section, the back support prevents the sides of the armature from dropping relative to the back support in use, a back surface of the base portion of the armature contactingly engaging the back support during use of the head support; and a hinge that attaches the armature to the back support to facilitate upwardly directed rotational movement of the armature away from the back support.

* * * * *